United States Patent [19]
Sidey

[11] Patent Number: 5,954,797
[45] Date of Patent: Sep. 21, 1999

[54] SYSTEM AND METHOD FOR MAINTAINING COMPATIBILITY AMONG NETWORK NODES CONNECTED TO A COMPUTER NETWORK

[75] Inventor: Michael J. Sidey, Middletown, N.J.

[73] Assignee: NCR Corporation, Dayton, Ohio

[21] Appl. No.: 08/855,690

[22] Filed: May 14, 1997

[51] Int. Cl.[6] .................................................. G06F 17/00
[52] U.S. Cl. ...................................... 709/223; 709/242
[58] Field of Search ................................. 395/180, 181, 395/182.01, 182.07, 182.11, 183.01, 200.38, 200.5, 284, 651, 653, 712

[56] References Cited

U.S. PATENT DOCUMENTS

| | | | |
|---|---|---|---|
| 5,499,357 | 3/1996 | Sonty et al. .............................. | 395/500 |
| 5,586,304 | 12/1996 | Stupek, Jr. et al. .................... | 395/712 |
| 5,752,042 | 5/1998 | Ole et al. ................................. | 395/712 |

*Primary Examiner*—Ellis B. Ramirez
*Attorney, Agent, or Firm*—William A. Munck; John T. Mockler

[57] ABSTRACT

For use in a computer network having a plurality of nodes associated therewith, a network management system for maintaining compatibility among the plurality of nodes, comprising 1) polling circuit that retrieves node configuration information from the plurality of nodes, and 2) a comparison circuit that compares selected node configuration information associated with a first selected one of the plurality of nodes with known-good node configuration information to determine a level of compatibility of the selected node with the known-good node configuration.

27 Claims, 3 Drawing Sheets

SYSTEM AND METHOD FOR MAINTAINING COMPATIBILITY AMONG NETWORK NODES CONNECTED TO A COMPUTER NETWORK

TECHNICAL FIELD OF THE INVENTION

The present invention is directed, in general, to network management systems and, more specifically, to a system and method for processing network management information to ensure compatibility among nodes in a computer network.

BACKGROUND OF THE INVENTION

A large communication network infrastructure, such as the Internet, is composed of many smaller communication networks, such as wide and local area networks. Depending on their communication function, the network components connected to the network infrastructure can be typically divided into three categories: end-systems, intermediate systems and media devices. End-systems typically comprise mainframes, workstations, printers and terminal servers. Intermediate systems typically comprise routers for providing connectivity between (among) wide area networks or between (among) local networks using different protocols. Media systems comprise bridges, hubs and repeaters. Bridges, hubs and repeaters can be used to connect two or more local area network sections together. Hubs and repeaters can also be used to form a local area network section. Broadly, all network components can be considered as network nodes that communicate with one another according to predetermined protocols by means of local area section(s), local area networks, wide area network(s), or the Internet, depending on the communication path required. Since a network handles communication transactions among a large number of network nodes connected to the network, it is important to maintain compatibility among all network nodes and identify network nodes that cause incompatibility whenever abnormal situations occur.

However, it has proved difficult to maintain network compatibility and/or to identify network incompatibilities for a number of reasons. In a large communication network, the hardware and software in the network nodes frequently may be supplied by different vendors. Also, network equipment vendors continually make incremental changes to their equipment to correct defects, to improve efficiency and speed, to add new capabilities, to meet new standards, and the like. Hardware and software updates in network nodes are frequently performed at local sites by local teams. It is possible, therefore, that a first portion of a communication network may be updated to a first hardware and software configuration, while a second portion of the communication network is updated to a second, and different, hardware and software configuration.

Frequently, there is no system in place to keep track of the hardware and software updates at each of the local sites. Furthermore, many large communication networks expand over time by incrementally adding new network nodes. The decisions regarding what types of hardware and software are to be used in a new network node may be made at the "sub-net" level, without centralized planning or control. Spotting an incompatibility problem may be made more difficult if the incompatibility is partial, that is, if network nodes can communicate with each other for some basic functions, but are unable to communicate with each other for more advanced functions or less frequently used functions. As a result, a large amount of manpower is spent maintaining compatibility, and identifying and resolving incompatibilities, in network nodes connected to a communication network.

It would be desirable, therefore, to have a communication network system that provides information that may be used to maintain compatibility among network nodes in a communication network, to predict potential incompatibility problems, and to identify those network nodes that cause incompatibility if problems occur.

There are well-known network management system protocols, such as Simple Network Management Protocol (SNMP), that enable a network management system to collect network management information from nodes in a communication network. SNMP is explained in greater detail in *The Simple Book, An Introduction to Internet Management* (second edition by Marshall T. Rose), which is hereby incorporated by reference into the present application as if fully set forth herein.

Typically, a network management system comprises at least one network management station which manages one or more network nodes (called "managed nodes"). The management information is exchanged between the management station and the managed nodes. A unit of network management information is referred to as a "managed object." Managed objects that are related are defined in the Management Information Base (MIB). The MIB can be located in a managed node and accessed via a network management protocol, such as SNMP. The management station executes a network management program and each of the managed nodes contains an agent capable of exchanging network management information with the management station.

In a network management system, each managed node is viewed as having a plurality of "variables." By reading (polling) the managed modes to obtain the values of these variables, the management station can monitor the managed nodes. By remotely changing (writing) the values of these variables, a management station can control the managed nodes. Unfortunately, even though existing network management systems are able to read MIB information from network nodes, these systems do not provide organized information to maintain compatibility among the network nodes, to predict potential incompatibility problems, and to identify the network nodes that cause incompatibility if problems occur.

Therefore, there is a need in the art for systems and methods in a communication network system that organize information, maintain compatibility among network nodes connected to a communication network, predict potential incompatibility problems, and identify network nodes that cause incompatibility if problems occur.

SUMMARY OF THE INVENTION

To address the above-discussed deficiencies of the prior art, the present invention provides for use in a computer network having a plurality of nodes associated therewith, a network management system for maintaining compatibility among the plurality of nodes. The network management system comprises a polling circuit that retrieves node configuration information from the plurality of nodes and a comparison circuit that compares selected node configuration information associated with a first selected one of the plurality of nodes with known-good node configuration information to determine a level of compatibility of the selected node with the known-good node configuration.

In one embodiment of the present invention, the polling circuit retrieves the node configuration information without human intervention. In another embodiment of the present invention, the comparison circuit detects a change in the first selected node from a first configuration to a second configuration. In still another embodiment of the present invention, the comparison circuit generates an alarm in response to a determination that the change decreases the level of compatibility.

In another embodiment of the present invention, the node configuration information is associated with a configuration of computer hardware devices in the first selected node. In an alternate embodiment of the present invention, the node configuration information is associated with a configuration of computer software in the first selected node.

In yet another embodiment of the present invention, the comparison circuit generates a report usable by an operator of the network to modify the first selected node to thereby increase the level of compatibility. In other embodiments, the comparison circuit modifies the first selected node to thereby increase the level of compatibility without human intervention.

In another embodiment of the present invention, the comparison circuit further compares the selected node configuration information associated with the first selected node and selected node configuration information associated with a second selected node with node configuration information associated with a known-good pair of nodes capable of communicating or interoperating with each other to thereby determine a level of interoperability of the first and second selected nodes. In yet another embodiment of the present invention, the comparison circuit generates a report usable by an operator of the network to modify the first and second selected nodes to thereby increase the level of interoperability.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
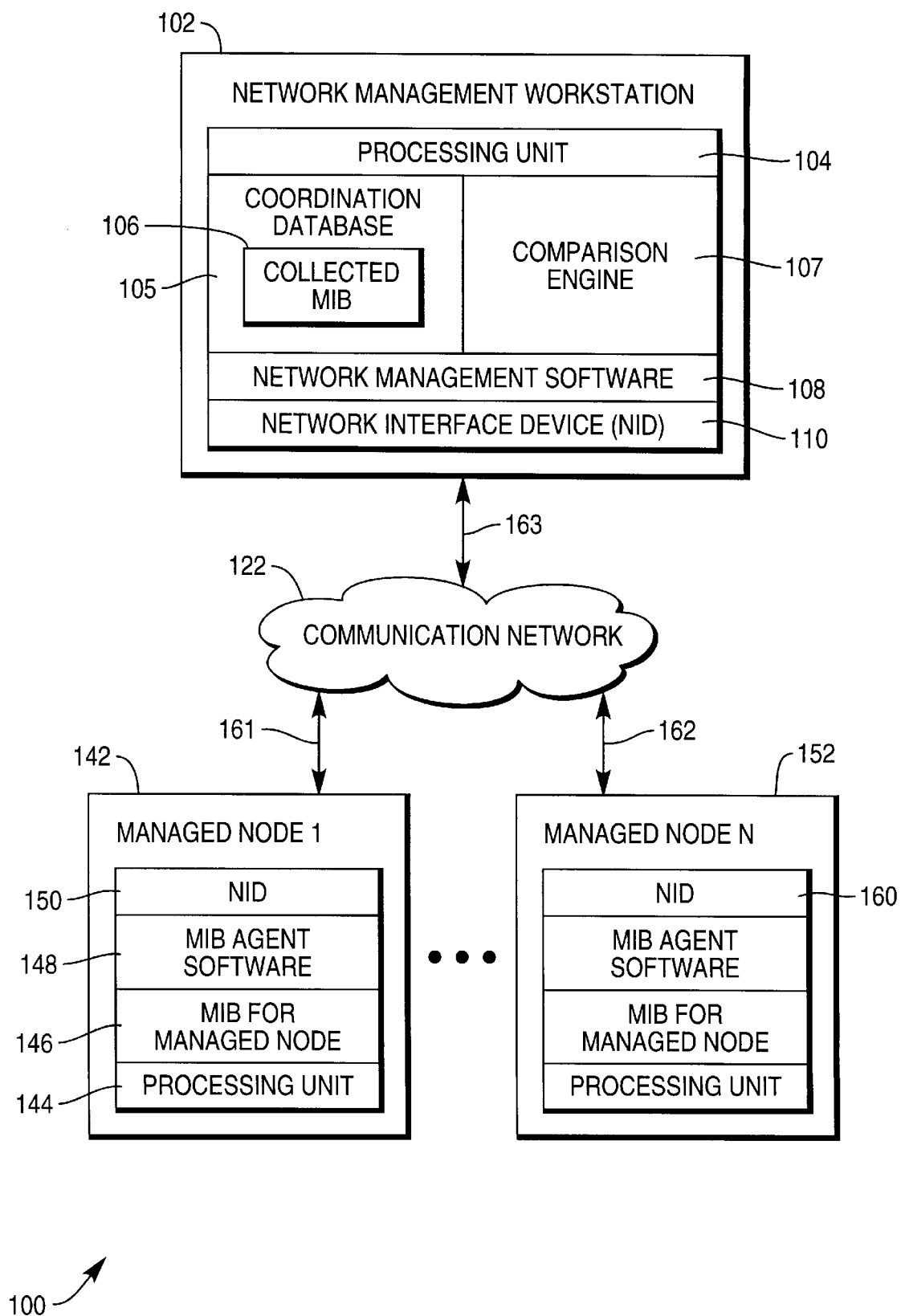
FIG. 1 is a block diagram of a communication network according to one embodiment of the present invention.

FIG. 1 is a block diagram of computer network 100 according to one embodiment of the present invention. Computer network 100 comprises network management station 102, communication network 122 and network nodes 142 and 152, which are exemplary ones of a plurality of managed nodes 1-N. Network nodes 142 and 152 are coupled to communication network 122 by data links 161 and 162, respectively, and network management station 102 is coupled to communication network 122 by data link 163. Communication network 122, which may be, for example, an Ethernet, provides data communications among network management station 102 and network nodes 142 and 152.

Each of the managed nodes performs one or more desired tasks. For example, a managed node that is a user terminal can run an operating system and user applications in a windowing environment. A managed node that is a router can receive data packets from a first network node and relay them to a second network node according to network addresses associated with the data packets.

Network management station 102 comprises processing unit 104, which includes system hardware and system software for operating network management workstation 102, coordination database 105, comparison engine 107, network management software 108, and network interface device (NID) 110. Coordination database 105 further includes collected management information base (MIB) 106, which contains the network management information collected from managed nodes 1-N.

Processing unit 104 controls the overall operation of network management station 102. Network management software 108 performs functions required by SNMP protocol, such as polling managed nodes, interrogating agents, discovering and collecting MIB information from managed nodes, directing managed nodes to forward traps, and assessing and compiling data with other network management stations when network management station 102 is be part of a coordinated group of management stations.

NID 150 in managed node 142, NID 160 in managed node 152, and NID 110 in network management workstation 102, send and receive messages in accordance with one or more network protocols over data links 161–163, respectively. Data links 161–163 may comprise any one of a number of well-known types of physical connections, such as IEEE 802.3 Ethernet, 10Base5, or 10BaseT allowable cables. NIDs 110, 150 and 160 allow their associated network node to communicate with other NIDs associated with network 122.

In operation, network management station 102 can get access to and read information from MIBs in the managed nodes, via network 122 according to UPD (User Datagram Protocol) protocol. Node 142 is representative of all managed nodes and comprises processing unit 144, which includes computer hardware circuitry and system software for running the managed node. Node 142 also comprises MIB 146 for managed node 142, MIB agent software 148, and NID 150.

MIB 146 stores network management information in the format required by a predetermined network management protocol, such as SNMP. MIB agent software 148 reads data from, and writes data to, MIB 146 and performs the functions of an agent required by SNMP. MIB agent software 148 obtains network management information by invoking routine software that reads from various memory locations maintained by an operating system (such as kernel in UNIX operating system). MIB agent software 148 then writes the network management information into MIB 146. Other software programs executed by processing unit 144 may be granted restricted access to the network management information stored in MIB 146. For example, the kernel of UNIX operating system can directly write to specific portions of MIB 146.

Figure 3:
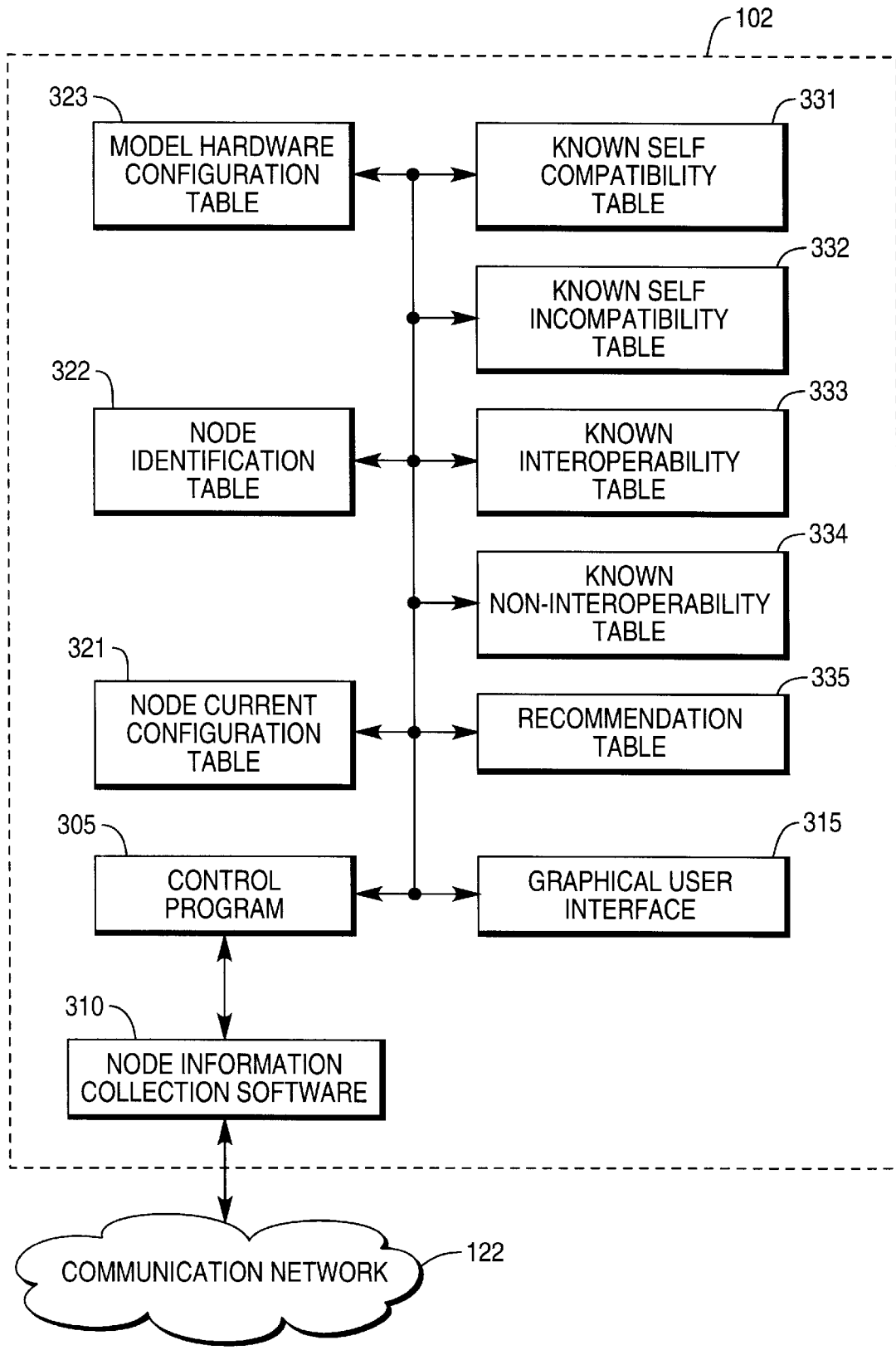
FIG. 3 is a detailed block diagram of a network management station according to one embodiment of the present invention.

Coordination database 105 comprises a plurality of tables, including collected management information base (MIB) 106, which contains the network management information collected from managed nodes 1–N. As will be explained below in greater detail with respect to FIG. 3, comparison engine 107 examines the data pertaining to each managed node contained in the tables of MIB 106 and generates additional status tables (or other output), detects incompatibilities in computer network 100, and recommends corrective action.

Figure 2:
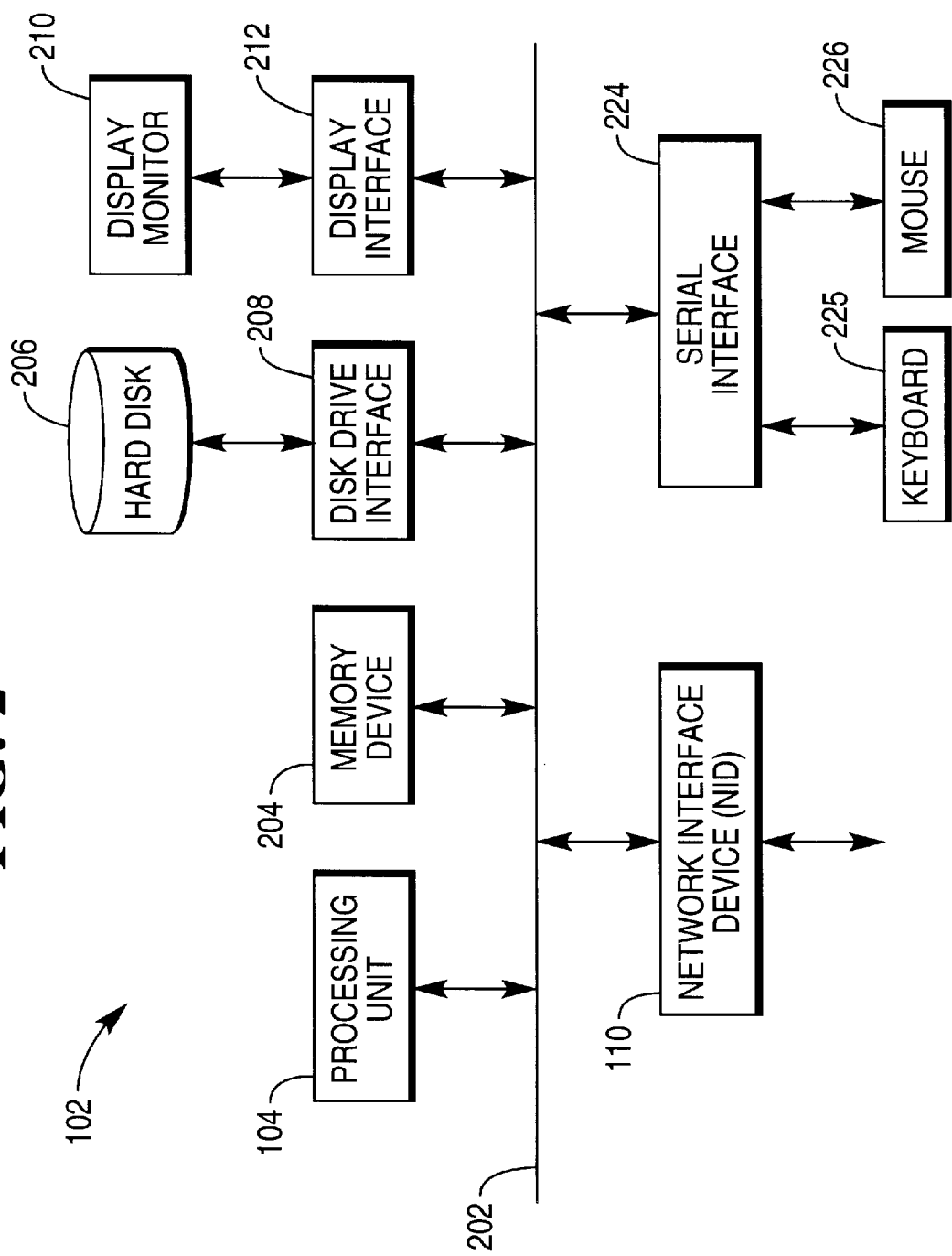
FIG. 2 is a block diagram of a network management station according to one embodiment of the present invention.

FIG. 2 is a block diagram of network management station 102 according to one embodiment of the present invention. Network management station 102 comprises system bus 202, processing unit 104 (shown in FIG. 1), network interface device (NID) 110 (also in FIG. 1), memory device 204, hard disk 206, disk drive interface 208, display monitor 210, display interface 212, serial interface 224, mouse 225, and keyboard 226. System bus 202 provides a communication path among processing unit 102, NID 110, memory device 204, disk drive interface 208, display interface 212 and serial interface 224. In alternate embodiments of the present invention, network management station 102 may also include audio input and output devices (not shown) and video input devices (not shown).

Memory device 204 stores programs (including instructions and data) that are executed by processing unit 104. Hard disk 206, operating through disk drive interface 208, also stores data and instructions. However, memory device 204, which is typically random access memory (RAM), has faster access speed than hard disk 206, while hard disk 206 has higher capacity than memory device 204. Processing unit 104 accesses memory device 204 and hard disk 206 in order to execute the programs stored therein and control the operation of network management station 102. Processing unit 104 also controls the transmission of programs and data between memory device 204 and hard disk 206.

Display monitor 210 is coupled to system bus 202 through display interface 212 and provides a visual interface between the user and programs being executed. Mouse 226 and keyboard 225 are coupled to system bus 202 through serial interface 224 and provide input points to network management station 102.

FIG. 3 is a detailed block diagram of network management station 102 according to one embodiment of the present invention. Network management software 108, which is executed by processing unit 104, includes control program 305. Control program 305 directs the interaction of other software modules in network management station 102. For example, control program 305 drives graphical user interface 315 on display monitor 210 to thereby interact with a user. Additionally, control program 305 causes node information collection software 310 to collect MIB data from the managed nodes via communication network 122.

Control program 305 also directs the flow of data between the various data tables in coordination database 105. These tables comprise two dimensional arrays of information arranged in rows and columns. Each column in a table represents a certain type or category of information, while each row represents an instance of each type of information.

In an illustrative embodiment of the present invention, an exemplary table, called the "Formal Name Table," comprises columns that represent Model Number, Formal Name, Location, Serial Number, etc. Each row of the exemplary table comprises a device in a managed node, such as a row containing the model number, formal name, location, serial number, etc., of a particular computer. The formal name of the computer may be resolved by an Internet name service in the IP protocol address of the computer. A second exemplary table, called the "Manufacturer's Model Table," contains strictly defined model numbers of computers associated with computer network 100 and comprises columns that represent Model Number, Manufacturer's Name, Microprocessor type, etc.

Such a table may be manually entered from a manufacturer's catalog of models. This is sometimes necessary because certain specifications about a particular model and the way it differs from a closely-related model may not always be available from an MIB object. For example, two models may have electrically identical hardware, but one may have a larger cabinet providing for a future second disk drive if the user wishes to add one. This information may not be automatically obtainable from some computer models. Therefore, the present invention allows for the manual entry of MIB data to supplement and complement the automatically collectable MIB data.

The two tables can be logically juxtaposed by a method called "joining," to form a virtual table. For example, the Formal Name Table and the Manufacturer's Model Table can be joined in coordination database 105 at their common column, Model Number. Databases are commonly divided into such separate sub-tables to avoid redundant information, which imposes large cost and speed problems as the size of the database grows. It also simplifies the entering of information into databases, since a new or modified table entry needs to be entered or changed only once in one table. The virtual table appears to have all of the columns of the two joined tables. A system user may then interrogate the database of the virtual table through a formalized query language, such as structured query language (SQL).

Collected MIB Table 106 contains all of the information critical to the operation of the present invention. Collected MIB Table 106 may be segmented into sub-tables, such as Node Current Configuration Table 321, Node Identification Table 322, Model Hardware Configuration Table 323, and the like. In one embodiment, collected MIB Table 106 comprises columns that represent individual MIB objects, such as Model Number, BIOS Version Number, Formal Name, Location, and as many other columns as are necessary to describe the computer or other type of managed node to the minimum level of detail required to determine software compatibility.

Tables 1 and 2 represent selected portions of exemplary MIB Table 106. Table 1 contains software MIB Object data that has been gathered from three computers in computer network 100. For example, Computer 1 is interrogated for its MIB Object data and Computer 1 returns an alphabetical listing of the values of its MIB Objects, namely, the values A001, A123 and A599. This process is then repeated for all other computers in computer network 100. In the example shown, Computer 2 returns MIB Object values A123, A599 and A602, and Computer 3 returns MIB Object values A001, A123, and A602. Thus, Computers 1, 2 and 3 contain four different types of software packages. It should be noted, however, that Table 1 may contain additional rows for other computers found in computer network 100 and additional columns for other types of software packages found in those other computers.

TABLE 1

MIB OBJECTS FOUND

| COMPUTER NO. | SOFTWARE MIB OBJECT 1 | SOFTWARE MIB OBJECT 2 | SOFTWARE MIB OBJECT 3 | SOFTWARE MIB OBJECT 4 | ... |
|---|---|---|---|---|---|
| COMP. 1 | A001 | A123 | A599 | -- | ... |
| COMP. 2 | A123 | A599 | A602 | -- | ... |
| COMP. 3 | A001 | A123 | A602 | -- | ... |
| ... | ... | ... | ... | ... | ... |
| COMP. N | -- | -- | -- | -- | ... |

Next, comparison engine 107 reorganizes the raw MIB Object data values into Unique MIB Object Groups. As shown in Table 2, a separate column is established for each MIB Object found anywhere in computer network 100. Comparison engine 107 can now determine the degree of compatibility between any two computers (or other processing devices) based on the number of columns containing entries for both computers. For, example, comparison engine 107 detects that computers 1 and 2 are identical in columns 2 and 3 (A123 and A599) and are different in column 1 (A001 is only in computer 1) and column 4 (A602 is only in computer 2). Comparison engine 107 concludes, therefore, that computer 1 and computer 2 are instances of different classes of computers.

TABLE 2

UNIQUE MIB OBJECT GROUPS

| COMPUTER | UNIQUE MIB OBJECT A | UNIQUE MIB OBJECT B | UNIQUE MIB OBJECT C | UNIQUE MIB OBJECT D | ... |
|---|---|---|---|---|---|
| COMP. 1 | A001 | A123 | A599 | -- | ... |
| COMP. 2 | -- | A123 | A599 | A602 | ... |
| COMP. 3 | A001 | A123 | -- | A602 | ... |
| ... | | | | | |
| COMP. N | -- | -- | -- | -- | |

However, if the network operator creates in the Known Interoperability Table a virtual class of computers which require only software packages A123 and A599 to be present in order to interoperate, then comparison engine 107 would mark both computer 1 and computer 2 as members of the "A123 and A599 virtual class." We can use the convenient notation "Class A123+A599." Computer 3 is not a member of Class A123+A599, since it does not contain software package A599.

Coordination database 105 also comprises Known Self Compatibility Table (KSCT) 331, which may be manually entered by a system operator. KSCT 331 contains a list of computers or other types of managed nodes that have been examined in day-to-day operation and found to be working properly internally (i.e, operate properly in stand alone mode). Due to the complexity of modern hardware and software, it is very common that a given configuration in one computer, "AA", will not work properly or at the same time in another computer, "AB", which has what appears to be minor or inconsequential variations, but those differences are indeed critical to one aspect of the correct operation of a specific software package or hardware device.

For example, a computer may have two installed dial-up communication packages, either of which may be manually started by the user. But, if the computer has access to only one modem, only one of the dial-up communication packages may be used at a time. Therefore, a first selected row of KSCT 331 may list the Formal Name of the computer in Column X and the first dial-up communication package in column Y, while a second selected row of KSCT 331 may list the same Formal Name in Column X and the second dial-up communication package in Column Z. This is because both cannot be used at the same time without manual intervention, namely, stopping one package and starting the other, although either is suitable for the purpose of dial-up communication by itself. Similar problems may occur when two software packages try to simultaneously use the same printer, or simultaneously access a single CD-ROM drive when each software package requires its own CD-ROM to be inserted in the drive.

The present invention assumes that software packages or hardware devices are ignorant of each other's presence and of each other's requirements for supporting software or hardware on the same managed node. It is also assumed that, as software packages are added or removed, the software packages make a check of the managed node for minimum pre-requisite hardware and needed pre-requisite software configurations. It is further assumed that a software package, during its installation or its removal, checks for earlier versions of itself, asks the user whether the earlier version should be left intact, or if the earlier version should be upgraded to the newer version, thereby effectively removing the older software package.

Coordination database 105 also comprises Known Interoperability Table (KIT) 333, which may be manually entered by a system operator. KIT 333 contains a list of computers or other types of managed nodes that have been examined in day-to-day operation and found to be properly interacting (or "interoperating") with one another (rather than internally). Two otherwise properly operating managed nodes, both of which may be inserted into KSCT 331, may be unable to communicate with each other.

For example, a first group or class of computers, G1, comprising computers C1 and C2, may have been adjusted by selecting certain modem options to communicate with each other. Similarly, a second group of computers, G2, comprising computers C3 and C4, may have been adjusted by modem options to communicate with each other. If the modem options in both groups are not identical, the G1 computers will be able to communicate with each other and the G2 computers will be able to communicate with each other, but the G1 computers will not be able to communicate with the G2 computers, and vice versa. The entries in KIT 333 would indicate that all computers in G1 are mutually compatible and that all computers in G2 are mutually compatible.

There are numerous network management systems known in the art that can collect hardware information and others that can collect software information. However, few of these prior art network management systems ever collect both software and hardware information, or ever cross-reference the collected software and hardware information with respect to each managed node.

The present invention improves upon the simple capabilities of the prior art systems in numerous aspects. The present invention collects all pertinent hardware and software information about a managed node, including firmware version(s), disk drive size(s), remaining storage space(s), microprocessor speed, RAM size, free RAM space, and a host of similar static and dynamic information that is typically ignored in the prior art systems. The present invention uses a common information collection scheme, such as MIB polling, for both hardware and software collection, and periodically automatically updates this information, rather than merely upon user-issued command. Hence, the information in Collected MIB Table 106 is always available and always current.

The present invention uses comparison engine 107 to compare the collected MIB data against Known Self Compatibility Table 331 and Known Interoperability Table 333 to determine how compatible each computer in computer network 100 is with the desired goals of these two tables. Any change in a value in Collected MIB Table 106 can therefore be detected automatically and an alarm may be issued to the system operator if the change decreases compatibility in computer network 100. Any such change may be noted in Known Self Incompatibility Table 332 or Known Non-Interoperability Table 334, as the case may be. Additionally, network management workstation (NMW) 102 may automatically generate for the system operator a list of necessary changes to be made to a managed node in order to bring a managed node back into compatibility.

In a preferred embodiment, NMW 102 automatically recognizes which of these corrective changes may be implemented without operator intervention. NMW 102 can then automatically download new firmware and software versions, clear up old "log" files and other obsolete information from mass storage devices, such as hard disk 206, and archive obsolescent data onto less expensive media, such as tape or magneto-optic disk. The MIB information is organized as a "tree" on each node and "branches" may be added by adding new software if the node has an SNMP Extensible Agent. An individual MIB "tree" can have many thousands of MIB objects.

In a preferred embodiment, NMW 102 may create virtual classes of nodes which can be placed in KSCT 331 and KIT 333 as a desired goal for other managed nodes in the network. For example, new microprocessors and new computer operating systems, such as Windows® 97, that have been announced but are still unavailable, may be entered into KSCT 331 and KIT 333 as parts of new managed nodes. Comparison engine 107 would be informed by a column in each of KSCT 331 and KIT 333 that these were hypothetical nodes. Comparison engine 107 then can generate lists indicating the effect and cost of updating each real managed node in computer network 100.

In this regard, selected ones of the columns in KSCT 331 may contain the current day-to-day dollar value of various models of computers in computer network 100. Other columns in KSCT 331 may contain the predicted life (in units of time) before a specific computer model (or other hardware or software) in computer network 100 becomes obsolete. It is common for older types of hardware to not work with newer software by choice of the software creator. It is also common for hardware manufacturers to not provide software adapters (device drivers) for older models which would enable them to work with new software products. Furthermore, comparison engine 107 and NMW 102 can recognize when a new piece of equipment can extend the life or increase the compatibility of a managed node. This may advantageously allow the managed node to be modified more cheaply with the new piece of equipment than would be the case if the managed node were replaced or completely overhauled.

Comparison engine 107 examines Collected MIB Table 106 and enters in each row that represents a particular managed node the Formal Name of the specific computer with which it is compatible, under a column called Equals Known Self Compatibility Class (or Equals KSC Class), only if the particular managed node equals or exceeds any of the entries in KSCT 331. Each managed node is equal to itself and comparison engine 107 enters "SELF" in Collected MIB Table 106 when this occurs.

Comparison engine 107 compares Collected MIB Table 106 row by row with all of the entries in KIT 333 and marks all computers that equal or exceed a particular KIT entry with the computer name of that entry, including "SELF" where necessary. These entries are made in a column called Equals Known Interoperability Class (or Equals KI Class).

After comparison engine 107 classifies all managed nodes against the known good classes in KST 331 and KIT 333, the system operator is aware of the status of compatibility of computer network 100 and know the number and type of disparate classes. Using the configuration information obtained form Collected MIB Table 106, comparison engine 107 examines each node in the Equals KI Class to determine what changes may be proposed to the system operator to convert managed modes from one class to another. For example, comparison engine 107 may determine that computers in a first class that have different modem settings than computer in a second class may be made compatible by resetting the modems in the first class to equal the modem settings in the second class. Alternatively, the modems in both classes may be reset to a third group of settings.

Although the present invention has been described in detail, those skilled in the art should understand that they can make various changes, substitutions and alterations herein without departing from the spirit and scope of the invention in its broadest form.

What is claimed is:

1. For use in a computer network having a plurality of nodes associated therewith, a network management system for maintaining compatibility among said plurality of nodes, comprising:

a polling circuit that retrieves node configuration information from said plurality of nodes; and a comparison circuit that compares selected node configuration information associated with a first selected one of said plurality of nodes with known-good node configuration information to determine a level of compatibility of said selected node with said known-good node configuration.

2. The network management system as recited in claim 1 wherein said polling circuit retrieves said node configuration information without human intervention.

3. The network management system as recited in claim 1 wherein said comparison circuit detects a change in said first selected node from a first configuration to a second configuration.

4. The network management system as recited in claim 3 wherein said comparison circuit generates an alarm in response to a determination that said change decreases said level of compatibility.

5. The network management system as recited in claim 1 wherein said node configuration information is associated with a configuration of computer hardware devices in said first selected node.

6. The network management system as recited in claim 1 wherein said node configuration information is associated with a configuration of computer software in said first selected node.

7. The network management system as recited in claim 1 wherein said comparison circuit generates a report usable by an operator of said network to modify said first selected node to thereby increase said level of compatibility.

8. The network management system as recited in claim 1 wherein said comparison circuit modifies said first selected node to thereby increase said level of compatibility without human intervention.

9. The network management system as recited in claim 1 wherein said comparison circuit further compares said selected node configuration information associated with said first selected node and selected node configuration information associated with a second selected node with node configuration information associated with a known-good pair of nodes capable of communicating with each another to thereby determine a level of interoperability of said first and second selected nodes.

10. The network management system as recited in claim 9 wherein said comparison circuit generates a report usable by an operator of said network to modify said first and second selected nodes to thereby increase said level of interoperability.

11. The system of claim 1, wherein said comparison circuit includes a formal name table and a manufacturer's model table.

12. The system of claim 11, wherein said formal name table includes information representing model number, formal name, location, serial number and said manufacturer's model table includes information representing model number, manufacturer's name, microprocessor type.

13. The system of claim 1, wherein said comparison circuit can determine a degree of compatibility between two nodes in the computer network.

14. The system of claim 1, wherein said comparison circuit group's node configurations into virtual classes and determines if each node configuration is in a virtual class to determine the level of compatibility of selected nodes.

15. The system of claim 1, wherein said comparison circuit includes a comparison engine and a coordination database.

16. The system of claim 15, wherein said coordination database includes a known self-compatibility table including information for computers which are operating properly internally.

17. The system of claim 1, wherein said comparison circuit includes an MIB table.

18. For use in a computer network having a plurality of nodes associated therewith, a method of maintaining compatibility among the plurality of nodes, comprising the steps of:

retrieving node configuration information from the plurality of nodes; and comparing selected node configuration information associated with a first selected one of the plurality of nodes with known-good node configuration information to determine a level of compatibility of the selected node with the known-good node configuration.

19. The method as recited in claim 18 wherein the step of retrieving the node configuration information is automatically performed by a polling circuit associated with the computer network.

20. The method as recited in claim 18 wherein the step of comparing includes the further step of detecting a change in the first selected node from a first configuration to a second configuration.

21. The method as recited in claim 20 including the further step of generating an alarm in response to a determination that the change decreases the level of compatibility.

22. The method as recited in claim 18 wherein the node configuration information is associated with a configuration of computer hardware devices in the first selected node.

23. The method as recited in claim 18 wherein the node configuration information is associated with a configuration of computer software in the first selected node.

24. The method as recited in claim 18 including the further step of generating a report usable by an operator of the network to modify the first selected node to thereby increase the level of compatibility.

25. The method as recited in claim 18 including the further step of automatically modifying the first selected node to thereby increase the level of compatibility without human intervention.

26. The method as recited in claim 18 wherein the step of comparing includes the further step of comparing the selected node configuration information associated with the first selected node and selected node configuration information associated with a second selected node with node configuration information associated with a known-good pair of nodes capable of communicating with each another to thereby determine a level of interoperability of the first and second selected nodes.

27. The method as recited in claim 26 including the further step of generating a report usable by an operator of the network to modify the first and second selected nodes to thereby increase the level of interoperability.

* * * * *